(No Model.) 2 Sheets—Sheet 1.

P. H. MUNROE.
POTATO HARVESTER.

No. 480,776. Patented Aug. 16, 1892.

Witnesses
P. A. Malberg
Edward McBray

Inventor
Paul H. Munroe, By
Thos. H. Hutchins his atty (No Model.) P. H. MUNROE. 2 Sheets—Sheet 2.
POTATO HARVESTER.
No. 480,776. Patented Aug. 16, 1892.
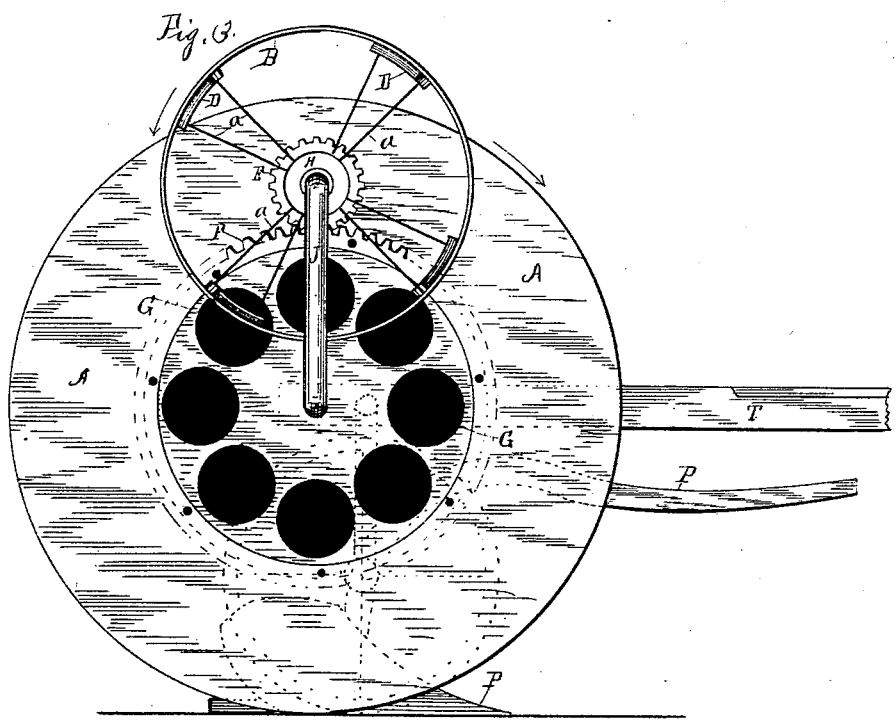
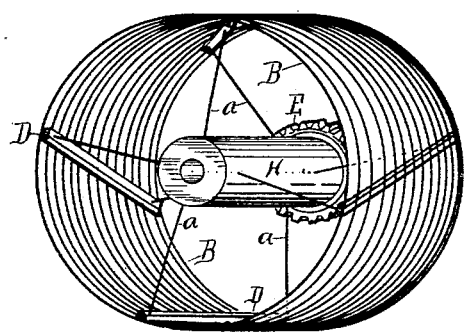
Witnesses
O. A. Malberg
Edward M. Bray
Inventor
Paul H. Munroe By
Thos. H. Hutchins his atty

UNITED STATES PATENT OFFICE.

PAUL H. MUNROE, OF PLAINFIELD, ILLINOIS.

POTATO-HARVESTER.

SPECIFICATION forming part of Letters Patent No. 480,776, dated August 16, 1892.

Application filed March 14, 1892. Serial No. 424,768. (No model.)

*To all whom it may concern:*

Be it known that I, PAUL H. MUNROE, a citizen of the United States of America, residing at Plainfield, in the county of Will and State of Illinois, have invented certain new and useful Improvements in Potato-Harvesting Machines, of which the following is a specification, reference being had therein to the accompanying drawings, and the letters of refence thereon, forming a part of this specification, in which—

Figure 1:
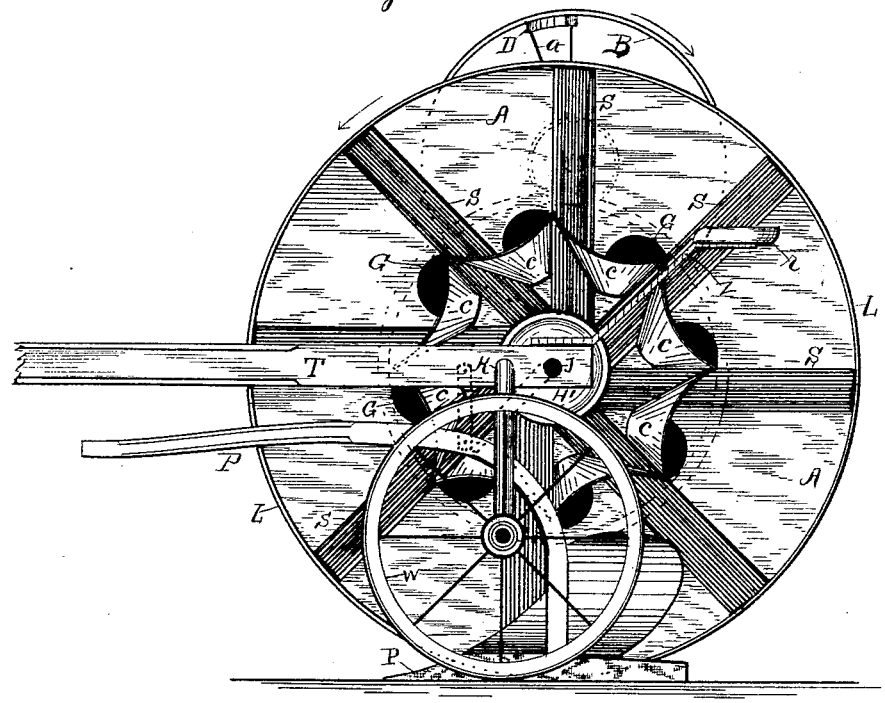
Figure 2:
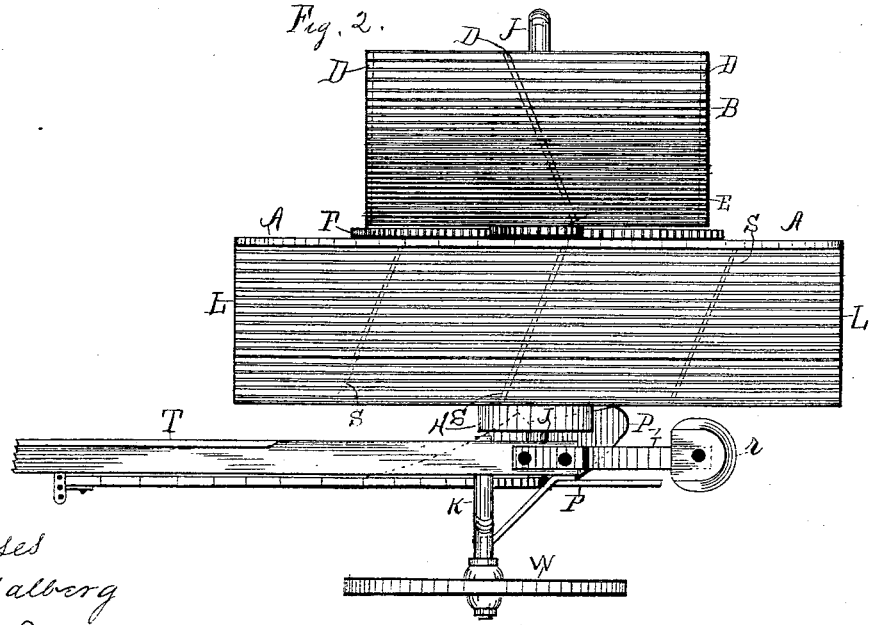

Figure 1 is a side elevation. Fig. 2 is a top plan view. Fig. 3 is a side elevation showing the opposite side of Fig. 1, and Fig. 4 is a perspective view of the rotating sifter.

This invention relates to certain improvements in potato-harvesting machines, which improvements are fully set forth in the following specification and claims.
Referring to the drawings, A represents a disk having a hub H', which turns on the shaft J, secured to the tongue T. Said disk is provided with a laterally-extending rim L, extending from its side toward said tongue, and is intended to be from eighteen inches to two feet wide, as is shown in Fig. 2. This rim is made of rods or bars arranged apart, so as to leave open spaces between them for the dirt to sift through, and the space inclosed by said rim is partitioned radially by means of the partitions S, also formed of rods or bars arranged apart, so as to leave open spaces between them, so dirt may sift through between them. These radial partitions have their inner ends secured in the hub H' of said disk and have their outer ends secured to the inner side of said rim L and are set at an angle to the axis of said hub and disk, as shown in Figs. 1 and 2, so they will more readily hold the dirt and potatoes that are plowed into the pockets between said radial partitions and conduct them to the discharge-openings in said disk. These radial partitions S, together with said rim L, form a series of radial recesses or pockets between them on the side of the disk A toward the tongue T.

The disk A is provided with discharge-openings G, leading from each one of said recesses or pockets through to a rotating sifter B on the opposite side of said disk from said pockets, as shown more particularly in Fig. 3. The said pockets are provided near their inner or lower ends and immediately below said discharge-openings G with curved bottoms c, descending toward said openings for the purpose of conducting the potatoes and any dirt that may not have been previously sifted out to the rotating sifter B and through said discharge-openings G.

The rotating sifter B is journaled and rotates on the shaft J, which is bent upward and then horizontally toward the disk A, so as to receive on its upper horizontal part the hub H' of said sifter. Said hub H' is provided on its end next the disk A with a pinion E, which meshes with an annular gear F, secured on the outer side of said disk, and from which annular gear said sifter B is rotated in the opposite direction from that in which said disk rotates. Said disk A and its rim L roll on the ground as the machine travels, and to balance the machine and maintain said disk in its upright position a traveling wheel W is attached to the machine at the opposite side of its tongue T from said disk by means of the cranked axle K, as shown particularly in Fig. 2. A driver's seat $r$ is secured on the rear end of said tongue by means of a spring-bar $z$ in the usual manner.

An ordinary plow P is arranged below the rear end of the tongue and adjacent to the pockets on the inner side of said disk, so it can throw the dirt and potatoes into said pockets, and may be attached to the machine in any manner desired, only so the plow is maintained in the proper position to do its work.

In Fig. 1 the plow is shown attached to the tongue of the machine by means of brace-bars, (shown in broken lines;) but as it may be used with any plow many different ways of attaching it to the machine may be used other than that shown.

In operation it is designed to attach a team to the tongue T and to plow P, and as the machine is drawn forward the disk A rolls on the ground at the side of the plow, so that the plow will turn the dirt containing the potatoes toward the disk and into its pockets formed by said radial partitions S and its rim L. As the disk rolls along a great share of the dirt will be sifted out through the spaces in said partitions and rim, and the potatoes and what dirt there may be remaining with them will be conducted by means of said curved bottoms c to the discharge-openings G, and through them into the rotating sifter B, which as it rotates sifts out the remaining dirt from the potatoes, which are propelled forward to be discharged from the open outer end of said sifter by means of a series of cross-bars D, arranged on the inner side of its periphery and at an angle with its axis and held in position by means of the sifter-spokes a, as shown in Fig. 4. It is intended to discharge the potatoes from the sifter B into a wagon that may travel with the machine, or they may be discharged into any other kind of a receptacle, or on the ground, if desired, so they may dry before being gathered.

The spaces between the bars of the sifter are wider toward its outer end than at its inner end, which is for the purpose of permitting the smaller potatoes to drop through before reaching the outer end of the sifter, so as to sort out the larger potatoes from the smaller ones, and such smaller potatoes may be discharged into another receptacle, not necessary to be shown.

Having thus described my invention, what I claim as new, and desire to secure by Letters Patent, is as follows, to wit:

1. The combination, with the disk A, having the discharge-openings G and annular gear F, of the rim L, formed of rods or slats having open spaces between them, radial partitions S, formed of rods or slats having open spaces between them, curved inclined bottoms c, rotating sifter B, having the pinion E, and inclined bars D, tongue T, traveling wheel W, bent axle H, and plow P, all arranged to operate substantially as and for the purpose set forth.

2. In a potato-harvesting machine, the disk A, having the discharge-openings G, and having a series of radial receptacles or pockets arranged on its side formed of the rim L, made of rods having spaces between them, and the radial diagonally-arranged partitions S, made of rods having spaces between them, and the curved inclined bottoms c for conducting material to said discharge-openings, the said disk and its rim being arranged to roll on the ground at the side of a plow and receive in its said receptacles or pockets the slice turned by the plow containing the potatoes, substantially as and for the purpose set forth.

3. In a potato-harvester, a wheel or disk adapted to roll on the ground and having radially-arranged sifting receptacles or pockets on its side for receiving the slice containing the potatoes from the plow, and having apertures leading from said receptacles to the opposite side of said disk for discharging the potatoes and unsifted material from said receptacles, in combination with a sifter for receiving the potatoes and unsifted material from said receptacles and discharging the potatoes sifted free from said material, substantially as and for the purpose set forth.

PAUL H. MUNROE.

Witnesses:
THOS. H. HUTCHINS,
PETER A. MALBERG.